United States Patent
Kunai

(10) Patent No.: US 10,126,592 B2
(45) Date of Patent: *Nov. 13, 2018

(54) POLARIZING PLATE AND DISPLAY APPARATUS

(71) Applicant: Sumitomo Chemical Company, Limited, Tokyo (JP)

(72) Inventor: Yuichiro Kunai, Arlington, MA (US)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/725,398

(22) Filed: Oct. 5, 2017

(65) Prior Publication Data

US 2018/0039135 A1    Feb. 8, 2018

Related U.S. Application Data

(63) Continuation of application No. 15/103,662, filed as application No. PCT/JP2014/082194 on Dec. 5, 2014, now Pat. No. 9,857,625.

(30) Foreign Application Priority Data

Dec. 12, 2013    (JP) .................................. 2013-257085

(51) Int. Cl.
    *G02F 1/1335*    (2006.01)
    *G02B 5/30*    (2006.01)
    *G02B 1/14*    (2015.01)

(52) U.S. Cl.
    CPC ......... *G02F 1/133528* (2013.01); *G02B 1/14* (2015.01); *G02B 5/3033* (2013.01)

(58) Field of Classification Search
    None
    See application file for complete search history.

(56) References Cited

U.S. PATENT DOCUMENTS 8,824,047 B2 *   9/2014   Tomoguchi ............ G02B 1/105
                                                        349/122
9,857,625 B2 *   1/2018   Kunai ................... G02B 5/3033
                          (Continued)

FOREIGN PATENT DOCUMENTS

CN    101408637 A    4/2009
JP    H01240517 A    9/1989
            (Continued)

OTHER PUBLICATIONS

Office Action dated Oct. 17, 2017 in JP Application No. 2013-257085.
(Continued)

*Primary Examiner* — Ashok Patel
(74) *Attorney, Agent, or Firm* — Panitch Schwarze Belisario & Nadel LLP

(57) ABSTRACT

A polarizing plate and a display apparatus including the polarizing plate are provided. The polarizing plate includes a polarizer, a first protective film disposed on one surface of the polarizer with a first adhesive layer having a thickness less than 2.0 μm being interposed, and a second protective film disposed on the other surface with a second adhesive layer having a thickness less than or equal to 2.0 μm being interposed, the second protective film being a protective film to be arranged on a side of a cell for display relative to the first protective film in arrangement of the polarizing plate on the cell for display, and the first adhesive layer being smaller in thickness than the second adhesive layer.

6 Claims, 3 Drawing Sheets

(56) References Cited

U.S. PATENT DOCUMENTS

| | | |
|---|---|---|
| 2002/0135735 A1 | 9/2002 | Yamamoto et al. |
| 2006/0227263 A1 | 10/2006 | Kunai |
| 2009/0153965 A1* | 6/2009 | Ito .................... G02B 1/105 359/489.2 |
| 2013/0216805 A1* | 8/2013 | Yasui ................ G02B 5/3025 428/216 |
| 2013/0279003 A1 | 10/2013 | Seo et al. |
| 2013/0293949 A1 | 11/2013 | Saito et al. |
| 2014/0000482 A1* | 1/2014 | Lee .................... G02B 1/105 106/287.21 |
| 2014/0300965 A1* | 10/2014 | Takeda ............... G02B 1/105 359/513 |
| 2015/0049380 A1 | 2/2015 | Takeda et al. |
| 2015/0346408 A1 | 12/2015 | Mizutani et al. |
| 2016/0313475 A1* | 10/2016 | Kunai .................. B32B 7/12 |

FOREIGN PATENT DOCUMENTS

| | | |
|---|---|---|
| JP | H0314882 A | 1/1991 |
| JP | H03122137 A | 5/1991 |
| JP | 2008170717 A | 7/2008 |
| JP | 2009109993 A | 5/2009 |
| JP | 2009109994 A | 5/2009 |
| JP | 2009134121 A | 6/2009 |
| JP | 2009139585 A | 6/2009 |
| JP | 2010091602 A | 4/2010 |
| JP | 2010091603 A | 4/2010 |
| JP | 2012144690 A | 8/2012 |
| JP | 2012203211 A | 10/2012 |
| JP | 2013092762 A | 5/2013 |
| JP | 2013210513 A | 10/2013 |
| JP | 2013228726 A | 11/2013 |
| TW | 201331640 A | 8/2013 |

OTHER PUBLICATIONS

Office Action dated Oct. 17, 2017 in CN Application No. 201480067600.8.
International Search Report dated Feb. 10, 2015 in International Application No. PCT/JP2014/082194.
Office Action dated Mar. 28, 2017 in U.S. Appl. No. 15/103,662.
Office Action dated Apr. 17, 2018 in TW Application No. 103142978.

* cited by examiner

POLARIZING PLATE AND DISPLAY APPARATUS

CROSS-REFERENCE TO RELATED APPLICATION

This application is a Continuation of U.S. patent application Ser. No. 15/103,662, filed Jun. 10, 2016, which is a Section 371 of International Application No. PCT/JP2014/082194, filed Dec. 5, 2014, which was published in the Japanese language on Jun. 18, 2015, under International Publication No. WO 2015/087790 A1,and the disclosure of which is incorporated herein by reference.

TECHNICAL FIELD

The present invention relates to a polarizing plate and a display apparatus including the same.

BACKGROUND ART

Polarizing plates are widely used in displays such as liquid crystal displays and particularly in recent years, in a variety of mobile devices such as smartphones and slate PCs. In general, a polarizing plate has a protective film bonded to one surface or opposing surfaces of a polarizer with an adhesive, and with deployment of the polarizing plate into mobile devices, decrease in thickness of a polarizer or a protective film which forms the polarizing plate has increasingly been demanded.

A photo-curable adhesive and a water-based adhesive such as a polyvinyl alcohol aqueous solution have been known as adhesives used for bonding between a polarizer and a protective film. Japanese Patent Laying-Open No. 2013-228726 (PTD 1), Japanese Patent Laying-Open No. 2013-210513 (PTD 2), Japanese Patent Laying-Open No. 2012-144690 (PTD 3), Japanese Patent Laying-Open No. 2012-203211 (PTD 4), Japanese Patent Laying-Open No. 2009-109994 (PTD 5), Japanese Patent Laying-Open No. 2009-139585 (PTD 6), Japanese Patent Laying-Open No. 2009-134121 (PTD 7), Japanese Patent Laying-Open No. 2010-091603 (PTD 8), Japanese Patent Laying-Open No. 2010-091602 (PTD 9), and Japanese Patent Laying-Open No. 2008-170717 (PTD 10) each describe a polarizing plate obtained by bonding a protective film to opposing surfaces of a polarizer with one or both of a photo-curable adhesive and a water-based adhesive.

CITATION LIST

Patent Document

PTD 1: Japanese Patent Laying-Open No. 2013-228726
PTD 2: Japanese Patent Laying-Open No. 2013-210513
PTD 3: Japanese Patent Laying-Open No. 2012-144690
PTD 4: Japanese Patent Laying-Open No. 2012-203211
PTD 5: Japanese Patent Laying-Open No. 2009-109994
PTD 6: Japanese Patent Laying-Open No. 2009-139585
PTD 7: Japanese Patent Laying-Open No. 2009-134121
PTD 8: Japanese Patent Laying-Open No. 2010-091603
PTD 9: Japanese Patent Laying-Open No. 2010-091602
PTD 10: Japanese Patent Laying-Open No. 2008-170717

SUMMARY OF INVENTION

Technical Problem

Studies conducted by the present inventor have revealed the fact that, with decrease in thickness of a polarizer or a protective film which constitutes a polarizing plate, a surface of the protective film bonded to the polarizer with an adhesive layer being interposed is distorted in a small area and wavy surface irregularities are produced. The surface irregularities do not directly adversely affect optical characteristics of the polarizing plate. When the protective film is arranged on an outer side (for example, on an outermost surface) in bonding of such a polarizing plate to a cell for display, however, the surface irregularities remain also after bonding. Then, an image reflected from the surface of the protective film is distorted and glossiness cannot be obtained. Therefore, disadvantages in terms of appearance such as lack of surface uniformity (a degree or a period of waviness of surface irregularities being different from place to place and consequently the surface irregularities being locally inconspicuous) or lack of a touch of class are caused.

An object of the present invention is to provide a small-thickness polarizing plate having good appearance when the polarizing plate is bonded to a cell for display and a display apparatus including the same.

Solution to Problem

The present invention provides a polarizing plate and a display apparatus as follows.

[1] A polarizing plate including:
a polarizer;
a first protective film disposed on one surface of the polarizer with a first adhesive layer having a thickness less than 2.0 μm being interposed; and
a second protective film disposed on the other surface of the polarizer with a second adhesive layer having a thickness less than or equal to 2.0 μm being interposed,
the second protective film being a protective film to be arranged on a side of a cell for display relative to the first protective film in arrangement of the polarizing plate on the cell for display, and
the first adhesive layer being smaller in thickness than the second adhesive layer.

[2] The polarizing plate according to [1], wherein the first and second adhesive layers are each a layer of a cured product of a photo-curable adhesive.

[3] The polarizing plate according to [1] or [2], wherein the first adhesive layer has a thickness less than or equal to 0.7 μm.

[4] The polarizing plate according to any of [1] to [3], wherein a difference in thickness between the second adhesive layer and the first adhesive layer is greater than or equal to 0.3 μm.

[5] The polarizing plate according to any of [1] to [4], wherein the polarizer has a thickness less than or equal to 10 μm.

[6] The polarizing plate according to any of [1] to [5], the polarizing plate further including a pressure-sensitive adhesive layer for bonding to the cell for display, which is laminated on an outer surface of the second protective film.

[7] A display apparatus including:
the cell for display; and
the polarizing plate according to any of [1] to [6] arranged on at least one surface of the cell for display.

Advantageous Effects of Invention

According to the present invention, a polarizing plate in which production of irregularities described above at the surface of the first protective film and distortion of a reflected image associated therewith are suppressed can be provided. Such a polarizing plate has excellent appearance because distortion of an image reflected from the surface of the first protective film is suppressed when the polarizing plate is arranged on a cell for display such that the first protective film is located on an outer side (a second protective film is located on a side of the cell for display).

DESCRIPTION OF EMBODIMENTS

<Polarizing Plate>

Figure 1:
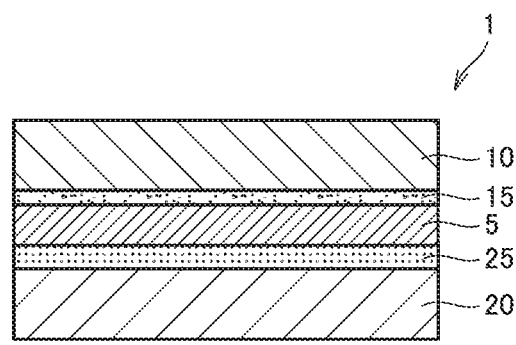
FIG. 1 is a schematic cross-sectional view showing an example of a layered structure of a polarizing plate according to the present invention.
Figure 2:
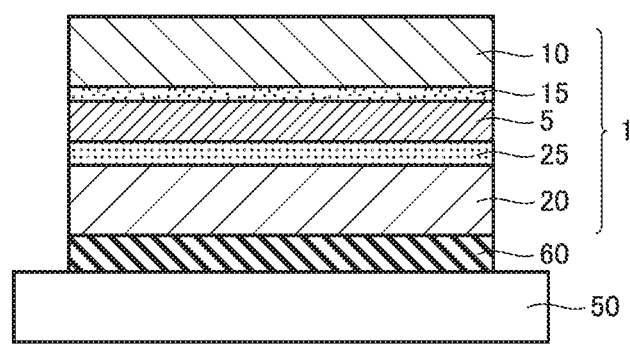
FIG. 2 is a schematic cross-sectional view showing the polarizing plate shown in FIG. 1 being arranged on a cell for display.

FIG. 1 is a schematic cross-sectional view showing an example of a layered structure of a polarizing plate according to the present invention. FIG. 2 is a schematic cross-sectional view showing the polarizing plate shown in FIG. 1 being arranged on a cell for display. The polarizing plate according to the present invention includes a polarizer 5, a first protective film 10 disposed on one surface thereof with a first adhesive layer 15 being interposed, and a second protective film 20 disposed on the other surface with a second adhesive layer 25 being interposed, as in a polarizing plate 1 shown in FIG. 1.

As shown in FIG. 2, first protective film 10 is a protective film to be arranged on an outer side relative to second protective film 20 when polarizing plate 1 is arranged on a cell for display 50 and typically a protective film that can form an outermost surface when polarizing plate 1 is arranged on cell for display 50. Second protective film 20 is a protective film to be arranged on a side of cell for display 50 relative to first protective film 10. Polarizing plate 1 can be arranged and bonded on cell for display 50 with the use of a pressure-sensitive adhesive layer 60 provided on the outer surface of second protective film 20 to be arranged on the side of cell for display 50.

(1) Thicknesses of Adhesive Layer

In the present invention, a thickness $T_1$ of first adhesive layer 15 interposed between polarizer 5 and first protective film 10 forming the outer surface (typically, the outermost surface) in arrangement of polarizing plate 1 on cell for display 50 is set to be smaller than a thickness $T_2$ of second adhesive layer 25 interposed between polarizer 5 and second protective film 20 to be arranged on the side of cell for display 50. In other words, first adhesive layer 15 has relatively small thickness $T_1$, whereas second adhesive layer 25 has relatively great thickness $T_2$.

By setting thickness $T_1$ of first adhesive layer 15 to be relatively small, contraction force produced at the time when an adhesive for forming first adhesive layer 15 is cured or dried can be lowered. Therefore, even when first protective film 10 and polarizer 5 are decreased in thickness, inability of first protective film 10 and polarizer 5 to resist against the contraction force resulting from the adhesive and resultant production of irregularities at the surface of first protective film 10 can be suppressed. Especially when polarizer 5 has a thickness less than or equal to 10 μm, deterioration of appearance due to production of surface irregularities is noticeable. Even in such a case, according to the present invention, a polarizing plate capable of achieving suppression of production of surface irregularities in first protective film 10 and resultant distortion in a reflected image, obtaining a sharp reflected image, having excellent glossiness of the surface of first protective film 10, and having surface uniformity and a touch of class can be provided.

First adhesive layer 15 has thickness $T_1$ specifically less than 2.0 μm and preferably less than or equal to 1.0 μm. When polarizer 5 has a thickness less than or equal to 10 μm, first adhesive layer 15 has thickness $T_1$ more preferably less than or equal to 0.7 μm and more preferably less than or equal to 0.4 μm in order to suppress production of surface irregularities by sufficiently suppressing contraction force caused by an adhesive.

First adhesive layer 15 has thickness $T_1$ normally greater than or equal to 0.01 μm and preferably greater than or equal to 0.05 μm. When thickness $T_1$ is smaller than 0.01 μm, sufficient adhesiveness may not be obtained.

As set forth above, in the present invention, thickness $T_1$ of first adhesive layer 15 which may affect appearance at the time when polarizing plate 1 is arranged on cell for display 50, that is, which is responsible for adhesion of first protective film 10 visually recognizable while polarizing plate 1 is arranged on cell for display 50, is set to be relatively small. On the other hand, the surface of second protective film 20 is not visually recognized while polarizing plate 1 is arranged on cell for display 50, and hence surface irregularities would substantially not adversely affect appearance even though they may be produced. Therefore, it is not necessary to set thickness $T_2$ of second adhesive layer 25 responsible for adhesion of second protective film 20 to be relatively small, and to the contrary, it is important to set the thickness to be relatively great for the following reason.

When an adhesive layer is too small in thickness, small bubbles may disadvantageously be introduced in the adhesive layer when a protective film and a polarizer are bonded to each other. Such bubbles themselves alone cannot visually be observed. Densely concentrated bubbles, however, cause light scattering when the polarizing plate is incorporated in such a display apparatus as a liquid crystal display and the display apparatus is turned on. Then, a disadvantage in terms of representation such as leakage of light in a black display state (bright points caused by bubbles) is caused.

Figure 3:
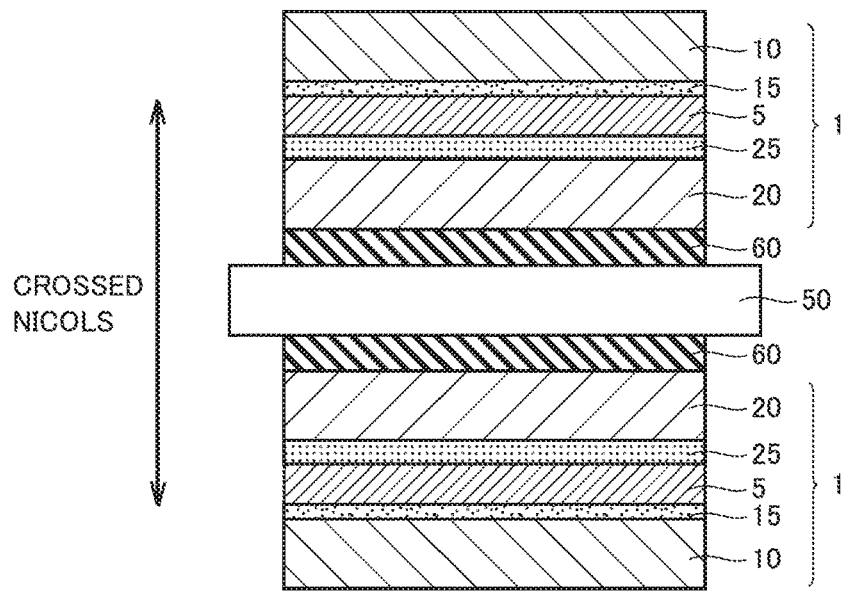
FIG. 3 is a schematic cross-sectional view showing an example of a layered structure of a liquid crystal display including a cell for display (liquid crystal cell) and polarizing plates arranged on a front side and a rear side thereof (a double side protective film-bearing polarizing plate).

Such light leakage due to bubbles is likely to give rise to a problem in second adhesive layer 25 interposed between polarizer 5 and second protective film 20 arranged on the side of cell for display 50 but is less likely to give rise to a problem in first adhesive layer 15 interposed between polarizer 5 and first protective film 10 arranged on the outer side. This is because second adhesive layer 25 is arranged in crossed nicols formed between polarizer 5 on the front side and polarizer 5 on the rear side with reference to FIG. 3 which shows a liquid crystal display including cell for display (liquid crystal cell) 50 and polarizing plates 1 arranged on the front side (a viewing side) and the rear side (a backlight side). When light scattering occurs in crossed nicols, black display is compromised and light leakage occurs. Therefore, it is important to set thickness $T_2$ of second adhesive layer 25 which is less likely to affect appearance in arrangement of polarizing plate 1 on cell for display 50 to be greater than thickness $T_1$ of first adhesive layer 15 so that light leakage in a black display state can be suppressed.

In contrast, since first adhesive layer 15 is arranged outside crossed nicols, light leakage is less likely even when thickness $T_1$ thereof is set to be relatively small and consequently bubbles are produced.

Second adhesive layer 25 has thickness $T_2$ normally less than or equal to 2.0 μm, and from a point of view of decrease in thickness of polarizing plate 1, the thickness is preferably less than or equal to 1.8 μm. Thickness $T_2$ exceeding 2.0 μm is disadvantageous in decrease in thickness of polarizing plate 1. Though the lower limit value for thickness $T_2$ is not particularly restricted so long as it is greater than thickness $T_1$ of first adhesive layer 15, from a point of view of adhesiveness, thickness $T_2$ is normally greater than or equal to 0.01 μm and preferably greater than or equal to 0.05 μm.

In order to effectively suppress irregularities at the surface of first protective film 10 and effectively suppress light leakage in a black display state, a difference between thickness $T_2$ of second adhesive layer 25 and thickness $T_1$ of first adhesive layer 15 is preferably greater than or equal to 0.3 μm, more preferably greater than or equal to 0.5 μm, and further preferably greater than or equal to 0.9 μm.

(2) Adhesive Forming Adhesive Layer

An adhesive used to form first and second adhesive layers 15 and 25 may be a photo-curable adhesive or a water-based adhesive. As described above, a factor for production of irregularities at the surface of first protective film 10 includes contraction force caused when an adhesive is cured or dried. Contraction force (per unit time) produced when a photo-curable adhesive achieves adhesion by curing of an adhesive layer in a short period of time by irradiation with light is generally higher than contraction force resulting from a water-based adhesive which achieves adhesion with a relatively long period of time being spent for drying of a solvent (water) by heating followed by aging as necessary. Therefore, the present invention can particularly suitably be applied to a case that first adhesive layer 15 is formed from a photo-curable adhesive, and an obtained effect of suppression of irregularities is high.

An adhesive used to form first adhesive layer 15 and an adhesive used to form second adhesive layer 25 may be of the same or different types. For the reasons described above, however, preferably, a photo-curable adhesive is employed as an adhesive for forming first adhesive layer 15. A photo-curable adhesive is preferably also employed as an adhesive for forming second adhesive layer 25. The photo-curable adhesive is also advantageous in that 1) it does not require a drying step because it can be prepared as a solventless adhesive and 2) it can be used for bonding of a protective film low in moisture permeability so that it can adapt to bonding of a wider variety of protective films than a water-based adhesive.

First and second adhesive layers 15 and 25 formed from a photo-curable adhesive are each a layer of a cured product of a photo-curable adhesive.

The photo-curable adhesive refers to an adhesive capable of being cured by exposure to active energy rays such as ultraviolet rays, examples of which can include an adhesive containing a polymerizable compound and a photopolymerization initiator, an adhesive containing a photoreactive resin, and an adhesive containing a binder resin and a photoreactive cross-linking agent. Examples of the polymerizable compound can include a photo-curable epoxy-based compound, a photo-curable vinyl compound such as a photo-curable acrylic compound, and a photo-curable urethane-based compound. Examples of the photopolymerization initiator can include a photo-cationic polymerization initiator (for example, in the case where a photo-curable epoxy-based compound is used) and a photo-radical polymerization initiator (for example, in the case where a photo-curable acrylic compound is used).

The water-based adhesive may be an adhesive including a polyvinyl alcohol-based resin aqueous solution or a two-component aqueous urethane-based emulsion adhesive. In particular, a water-based adhesive including a polyvinyl alcohol-based resin aqueous solution is suitably used.

The polyvinyl alcohol-based resin may be a vinyl alcohol homopolymer obtained by saponifying polyvinyl acetate that is a homopolymer of vinyl acetate; a polyvinyl alcohol-based copolymer obtained by saponifying a copolymer of vinyl acetate and other monomers copolymerizable therewith; or a modified polyvinyl alcohol-based polymer obtained by partially modifying hydroxyl groups of these polymers. The water-based adhesive may contain an additive such as polyvalent aldehyde, a water-soluble epoxy compound, a melamine-based compound, a zirconia compound, or a zinc compound.

(3) Polarizer

Polarizer 5 may be a uniaxially stretched polyvinyl alcohol-based resin layer having a dichroic dye adsorbed and oriented in the layer. Polarizer 5 has a thickness preferably less than or equal to 10 μm and more preferably less than or equal to 7 μm. A thickness of polarizer 5 less than or equal to 10 μm is advantageous in decrease in thickness of polarizing plate 1. According to the present invention, even when polarizer 5 with such a small thickness is employed, irregularities at the surface of first protective film 10 can effectively be suppressed.

The polyvinyl alcohol-based resin used to constitute the polyvinyl alcohol-based resin layer may be a product obtained by saponifying a polyvinyl acetate-based resin. Examples of the polyvinyl acetate-based resin include polyvinyl acetate that is a homopolymer of vinyl acetate, and a copolymer of vinyl acetate and other monomers copolymerizable therewith. Examples of other monomers copolymerizable with vinyl acetate include unsaturated carboxylic acids, olefins, vinyl ethers, unsaturated sulfonic acids, and ammonium group-containing acrylamides.

The polyvinyl alcohol-based resin is subjected to film formation to form polarizer 5. The method for subjecting the polyvinyl alcohol-based resin to film formation is not particularly limited and may be a known method. In order to easily form polarizer 5 having a thickness less than or equal to 10 μm, a solution of the polyvinyl alcohol-based resin is preferably applied onto a substrate film to form a film.

Polarizer 5 needs to have undergone stretching for orientation. Polarizer 5 is stretched to a stretch ratio of preferably more than 5 and to a stretch ratio of more preferably more than 5 and less than or equal to 17.

The polyvinyl alcohol-based resin may have a saponification degree in the range of 80.0 to 100.0 mol %, preferably in the range of 90.0 to 99.5 mol %, and more preferably in the range of 94.0 to 99.0 mol %. If the saponification degree is less than 80.0 mol %, resulting polarizing plate 1 may have reduced resistance to water and moist heat. If the polyvinyl alcohol-based resin used has a saponification degree greater than 99.5 mol %, the speed of dyeing the resin may be low so that the productivity may decrease and resulting polarizer 5 may fail to have sufficient polarizing performance.

The saponification degree is a unit ratio (mol %) representing a rate of conversion from acetic acid groups (acetoxy groups (—OCOCH$_3$)) in a polyvinyl acetate-based resin as a raw material for the polyvinyl alcohol-based resin into hydroxyl groups by a saponification process. This is defined by the following formula.

Saponification degree (mol %)=100×(the number of hydroxyl groups)÷(the number of hydroxyl groups+the number of acetic acid groups)

A saponification degree can be determined according to JIS K 6726 (1994). A higher saponification degree indicates a higher hydroxyl group content and thus indicates a lower content of acetic acid groups capable of inhibiting crystallization.

The polyvinyl alcohol-based resin may be modified polyvinyl alcohol obtained by partially modifying polyvinyl alcohol. Examples of the modified polyvinyl alcohol include those obtained by modifying a polyvinyl alcohol-based resin with an olefin such as ethylene or propylene, an unsaturated carboxylic acid such as acrylic acid, methacrylic acid, or crotonic acid, an alkyl ester of an unsaturated carboxylic acid, or acrylamide. The modification rate is preferably less than 30 mol % and more preferably less than 10%. If modification is performed at a rate higher than 30 mol %, the modified product is less likely to adsorb a dichroic dye and resulting polarizer 5 may fail to have sufficient polarizing performance.

The polyvinyl alcohol-based resin preferably has an average polymerization degree of 100 to 10000, more preferably 1500 to 8000, and even more preferably 2000 to 5000. The average polymerization degree of the polyvinyl alcohol-based resin can be determined also according to JIS K 6726 (1994).

Examples of commercially available products of the polyvinyl alcohol-based resin suitably used in the present invention include PVA 124 (saponification degree: 98.0-99.0 mol %), PVA 117 (saponification degree: 98.0-99.0 mol %), PVA 624 (saponification degree: 95.0-96.0 mol %), and PVA 617 (saponification degree: 94.5-95.5 mol %) manufactured by KURARAY Co., Ltd.; AH-26 (saponification degree: 97.0-98.8 mol %), AH-22 (saponification degree: 97.5-98.5 mol %), NH-18 (saponification degree: 98.0-99.0 mol %), and N-300 (saponification degree: 98.0-99.0 mol %) manufactured by The Nippon Synthetic Chemical Industry Co., Ltd.; and JC-33 (saponification degree: greater than or equal to 99.0 mol %), JM-33 (saponification degree: 93.5-95.5 mol %), JM-26 (saponification degree: 95.5-97.5 mol %), JP-45 (saponification degree: 86.5-89.5 mol %), JF-17 (saponification degree: 98.0-99.0 mol %), JF-17L (saponification degree: 98.0-99.0 mol %), and JF-20 (saponification degree: 98.0-99.0 mol %) manufactured by JAPAN VAM & POVAL Co., Ltd., all of which are trademarks.

The dichroic dye contained (adsorbed and oriented) in polarizer 5 can be iodine or a dichroic organic dye. Specific examples of the dichroic organic dye include Red BR, Red LR, Red R, Pink LB, Rubin BL, Bordeaux GS, Sky Blue LG, Lemon Yellow, Blue BR, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo Red, Brilliant Violet BK, Supra Blue G, Supra Blue GL, Supra Orange GL, Direct Sky Blue, Direct Fast Orange S, and Fast Black. One dichroic dye may be used alone, or two or more dichroic dyes may be used in combination.

(4) First and Second Protective Films

First and second protective films 10 and 20 can each be a transparent resin film composed of a thermoplastic resin, such as a polyolefin-based resin such as an acyclic polyolefin-based resin (such as a polypropylene-based resin) or a cyclic polyolefin-based resin (such as a norbornene-based resin); a cellulose ester-based resin such as cellulose triacetate or cellulose diacetate; a polyester-based resin such as polyethylene terephthalate, polyethylene naphthalate, or polybutylene terephthalate; a polycarbonate-based resin; a (meth)acrylic resin; or any mixture or copolymer thereof. First and second protective films 10 and 20 may be of the same or different types.

A cyclic polyolefin-based resin is a generic name for resins obtained by polymerization of cyclic olefins as polymerization units, such as resins disclosed in Japanese Patents Laying-Open Nos. H01-240517, H03-14882, and H03-122137. Specific examples of the cyclic polyolefin-based resin include ring-opened (co)polymers of cyclic olefins, addition polymers of cyclic olefins, copolymers (typically random copolymers) of cyclic olefins and chain olefins such as ethylene and propylene, graft polymers obtained by modifying these polymers with an unsaturated carboxylic acid or a derivative thereof, and hydrides thereof. In particular, norbornene-based resins containing a norbornene monomer, such as norbornene or a polycyclic norbornene monomer, as the cyclic olefin are preferably used.

Various products of a cyclic polyolefin-based resin are commercially available. Examples of commercially available products of the cyclic polyolefin-based resin include Topas (manufactured by Topas Advanced Polymers GmbH and available from Polyplastics Co., Ltd.), ARTON (manufactured by JSR Corporation), ZEONOR (manufactured by Zeon Corporation), ZEONEX (manufactured by Zeon Corporation), and APEL (manufactured by Mitsui Chemicals, Inc.), all of which are trademarks.

The protective film may also be a commercially available product produced by forming a cyclic polyolefin-based resin into a film, such as Escena (manufactured by Sekisui Chemical Co., Ltd.), SCA40 (manufactured by Sekisui Chemical Co., Ltd.), and ZEONOR Film (manufactured by Zeon Corporation), all of which are trademarks.

The cellulose ester-based resin is an ester of cellulose and a fatty acid. Specific examples of the cellulose ester-based resin include cellulose triacetate, cellulose diacetate, cellulose tripropionate, and cellulose dipropionate. Copolymers of these resins or resins obtained by partially modifying hydroxyl groups of these resins with other substituents can also be used. Among them, cellulose triacetate (triacetylcellulose (TAC)) is particularly preferred. There are many commercially available products of cellulose triacetate, and the products are also advantageous in terms of easy availability and cost. Examples of commercially available products of cellulose triacetate include FUJITAC TD80 (manufactured by FUJIFILM Corporation), FUJITAC TD80UF (manufactured by FUJIFILM Corporation), FUJITAC TD80UZ (manufactured by FUJIFILM Corporation), FUJITAC TD40UZ (manufactured by FUJIFILM Corporation), KC8UX2M (manufactured by Konica Minolta Opto Co., Ltd.), and KC4UY (manufactured by Konica Minolta Opto Co., Ltd.), all of which are trademarks.

First protective film 10 and/or second productive film 20 can also be a protective film capable of also having an optical function, such as a retardation film or a brightness enhancement film. For example, the transparent resin film made of the above material may be stretched (uniaxially or biaxially stretched) or coated with a liquid crystal layer to form a retardation film with any retardation value.

A surface treatment layer (coating layer) such as a hard coat layer, an antiglare layer, an antireflection layer, an antistatic layer, or an antifouling layer can also be formed on the surface of first protective film 10 and/or second protective film 20 opposite to polarizer 5. The method used to form the surface treatment layer on the protective film surface is not particularly limited and may be a known method.

Though thicknesses of first and second protective films 10 and 20 are preferably small from a point of view of decrease in thickness of polarizing plate 1, too small a thickness leads to lowering in strength and poor workability. Therefore, first and second protective films 10 and 20 each have a thickness preferably from 5 to 90 μm, more preferably from 5 to 60 μm, and further preferably from 5 to 50 μm. According to the present invention, even when first protective film 10 has a thickness less than or equal to 50 μm, irregularities at the surface of first protective film 10 can effectively be suppressed.

(5) Pressure-Sensitive Adhesive Layer

Pressure-sensitive adhesive layer 60 for bonding polarizing plate 1 to another member (such as cell for display 50 of a display apparatus) may also be disposed on an outer surface (a surface opposite to polarizer 5) of second protective film 20 in polarizing plate 1, as shown in FIG. 2. A pressure-sensitive adhesive used to form pressure-sensitive adhesive layer 60 is normally composed of a pressure-sensitive adhesive composition produced by adding a cross-linking agent such as an isocyanate compound, an epoxy compound, or an aziridine compound to a (meth)acrylic resin, a styrene-based resin, a silicone-based resin, or other base polymers The pressure-sensitive adhesive layer may further contain fine particles to have light-scattering properties.

Although pressure-sensitive adhesive layer 60 can have a thickness of 1 to 40 μm, it is preferably formed to have a small thickness so long as its properties such as workability and durability are not impaired. Specifically, the pressure-sensitive adhesive layer preferably has a thickness of 3 to 25 μm. The thickness of 3 to 25 μm is also suitable in order to provide good workability and control dimensional changes of polarizer 5. Pressure-sensitive adhesive layer 60 with a thickness less than 1 μm may have reduced tackiness, and the pressure-sensitive adhesive layer with a thickness greater than 40 μm may easily suffer from a defect such as oozing of the pressure-sensitive adhesive.

A method for forming pressure-sensitive adhesive layer 60 is not particularly limited. The pressure-sensitive adhesive layer may be formed by applying a pressure-sensitive adhesive composition (pressure-sensitive adhesive solution) to the surface of second protective film 20, the composition containing components including the base polymer mentioned above, and drying the composition. Alternatively, pressure-sensitive adhesive layer 60 may be formed on a separator (release film) and then transferred onto the surface of second protective film 20 or polarizer 5. If necessary, a surface treatment such as a corona treatment may be performed on the surface of second protective film 20 or of polarizer 5 or the surface of pressure-sensitive adhesive layer 60 in the process of forming pressure-sensitive adhesive layer 60 on the surface of second protective film 20.

(6) Optical Layer

Polarizing plate 1 can further include an additional optical layer disposed on first protective film 10 or second protective film 20. The additional optical layer may be a reflective polarizing film capable of allowing passage of a certain type of polarized light and reflecting polarized light of a type reverse thereto, a film with an antiglare function having irregularities on its surface, a film with a surface reflection-preventing function, a reflective film having a surface reflecting function, a translucent reflective film having both of reflecting and transmitting functions, or a viewing angle compensation film.

Examples of a commercially available product corresponding to the reflective polarizing film capable of allowing passage of a certain type of polarized light and reflecting polarized light of a type reverse thereto include DBEF (manufactured by 3M Company and available from Sumitomo 3M Limited in Japan) and APF (manufactured by 3M Company and available from Sumitomo 3M Limited in Japan).

Examples of the viewing angle compensation film include an optical compensation film having a liquid crystalline compound applied, oriented, and fixed onto the surface of a substrate, a retardation film including a polycarbonate-based resin, and a retardation film including a cyclic polyolefin-based resin.

Examples of a commercially available product corresponding to the optical compensation film having a liquid crystalline compound applied, oriented, and fixed onto the surface of a substrate include WV Film (manufactured by FUJIFILM Corporation), NH Film (manufactured by JX Nippon Oil & Energy Corporation), and NR Film (manufactured by JX Nippon Oil & Energy Corporation).

Examples of a commercially available product corresponding to the retardation film including a cyclic polyolefin-based resin include ARTON Film (manufactured by JSR Corporation), Escena (manufactured by Sekisui Chemical Co., Ltd.), and ZEONOR Film (manufactured by Zeon Corporation).

<Method of Producing Polarizing Plate>

Figure 4:
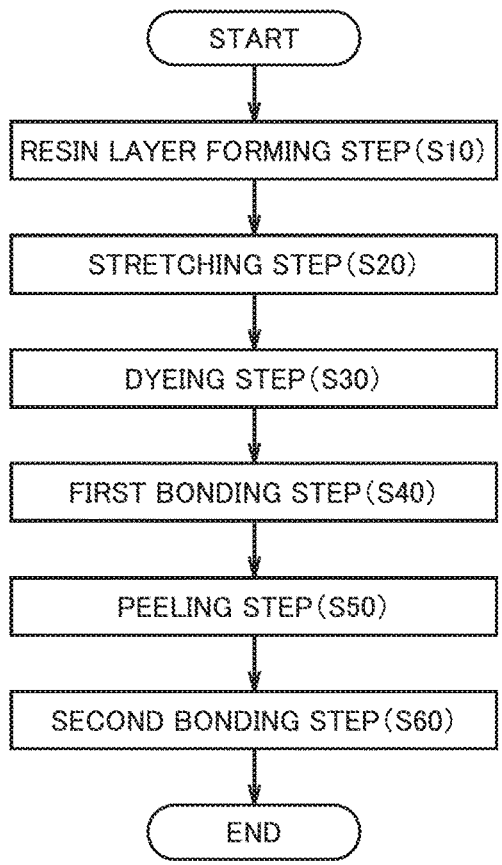
FIG. 4 is a flowchart showing a preferred example of a method for producing a polarizing plate according to the present invention.

The polarizing plate of the present invention can suitably be produced, for example, with the method shown in FIG. 4. The method for producing the polarizing plate shown in FIG. 4 includes, in this order, the following steps:

(1) a resin layer forming step S10 that includes applying a polyvinyl alcohol-based resin-containing coating liquid to at least one surface of a substrate film and then drying the coating to form a polyvinyl alcohol-based resin layer, so that a laminated film is obtained;

(2) a stretching step S20 that includes stretching the laminated film to obtain a stretched film;

(3) a dyeing step S30 that includes dyeing the polyvinyl alcohol-based resin layer of the stretched film with a dichroic dye to form a polarizer, so that a polarizing laminated film is obtained;

(4) a first bonding step S40 that includes bonding any one of first and second protective films onto the polarizer of the polarizing laminated film with an adhesive layer being interposed, to obtain a laminate film;

(5) a peeling step S50 that includes peeling off the substrate film from the laminate film to obtain a single side protective film-bearing polarizing plate; and (6) a second bonding step S60 that includes bonding another one of the first and second protective films to the surface of the polarizer of the single side protective film-bearing polarizing plate with an adhesive layer being interposed. Hereinafter, each step will be described with reference to FIGS. 5 to 9.

(1) Resin Layer Forming Step S10

Figure 5:
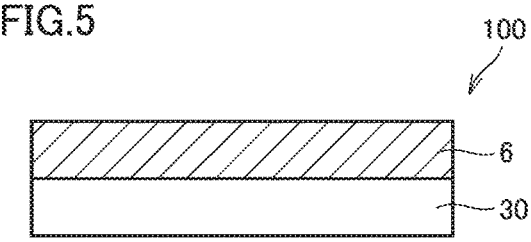
FIG. 5 is a schematic cross-sectional view showing an example of a layered structure of a laminated film obtained in a resin layer forming step.

Referring to FIG. 5, the present step includes forming a polyvinyl alcohol-based resin layer 6 on at least one surface of a substrate film 30 to obtain a laminated film 100. Polyvinyl alcohol-based resin layer 6 is to be turned into polarizer 5 through stretching step S20 and dyeing step S30. Polyvinyl alcohol-based resin layer 6 can be formed by applying a polyvinyl alcohol-based resin-containing coating liquid to one or both surfaces of substrate film 30 and drying the coating layer. Such a method of forming the polyvinyl alcohol-based resin layer by coating is advantageous in that it can easily form polarizer 5 having a small thickness.

[Substrate Film]

Substrate film 30 can be composed of a thermoplastic resin. In particular, substrate film 30 is composed preferably of a thermoplastic resin with a high level of transparency, mechanical strength, thermal stability, stretchability, and other properties. Specific examples of such a thermoplastic resin include a polyolefin-based resin such as an acyclic polyolefin-based resin or a cyclic polyolefin-based resin (such as a norbornene-based resin), a polyester-based resin, a (meth)acrylic resin, a cellulose ester-based resin such as cellulose triacetate or cellulose diacetate, a polycarbonate-based resin, a polyvinyl alcohol-based resin, a polyvinyl acetate-based resin, a polyarylate-based resin, a polystyrene-based resin, a polyethersulfone-based resin, a polysulfone-based resin, a polyamide-based resin, a polyimide-based resin, and mixtures or copolymers thereof.

Substrate film 30 may have a monolayer structure including a single resin layer of one or more thermoplastic resins or may have a multilayer structure including a stack of resin layers each containing one or more thermoplastic resins. Substrate film 30 is preferably composed of a resin capable of being stretched at a temperature suitable for stretching of polyvinyl alcohol-based resin layer 6 at the time of stretching of laminated film 100 in stretching step S20 described below.

The acyclic polyolefin-based resin can be a homopolymer of an acyclic olefin, such as a polyethylene resin or a polypropylene resin, or a copolymer of two or more acyclic olefins. Substrate film 30 composed of the acyclic polyolefin-based resin is advantageous in that it can be stably stretched at a high ratio. In particular, substrate film 30 is more preferably composed of a polypropylene-based resin (a polypropylene resin as a homopolymer of propylene or a propylene-based copolymer) or a polyethylene-based resin (a polyethylene resin as a homopolymer of ethylene or an ethylene-based copolymer).

The propylene-based copolymer representing an example of the thermoplastic resin suitably used to compose substrate film 30 is a copolymer of propylene and other monomers copolymerizable therewith.

Examples of other monomers copolymerizable with propylene include ethylene and an α-olefin. The α-olefin is preferably an α-olefin having a carbon number greater than or equal to 4 and more preferably an α-olefin having a carbon number from 4 to 10. Specific examples of the α-olefin having a carbon number from 4 to 10 include linear monoolefins such as 1-butene, 1-pentene, 1-hexene, 1-heptene, 1-octene, and 1-decene; branched monoolefins such as 3-methyl-1-butene, 3-methyl-1-pentene, and 4-methyl-1-pentene; and vinylcyclohexane. The copolymer of propylene and other monomers copolymerizable therewith may be a random copolymer or a block copolymer.

A content of other monomers in the copolymer is, for example, 0.1 to 20% by weight and preferably 0.5 to 10% by weight. The content of other monomers in the copolymer can be determined by performing infrared (IR) spectroscopy according to the method described on page 616 of Kobunshi Bunseki Handbook (Polymer Analysis Handbook) (1995, published by KINOKUNIYA COMPANY Ltd.).

Among the above, a homopolymer of propylene, a propylene-ethylene random copolymer, a propylene-1-butene random copolymer, or a propylene-ethylene-1-butene random copolymer is preferably used as the polypropylene-based resin.

The polypropylene-based resin preferably has substantially isotactic or syndiotactic stereoregularity. Substrate film 30 composed of a polypropylene-based resin having substantially isotactic or syndiotactic stereoregularity has relatively high handleability and high mechanical strength under a high-temperature environment.

The polyester-based resin is a resin having ester bonds, and is generally formed of a polycondensate of a polyvalent carboxylic acid or a derivative thereof and a polyhydric alcohol. The polyvalent carboxylic acid or the derivative thereof may be a bivalent dicarboxylic acid or a derivative thereof, examples of which include terephthalic acid, isophthalic acid, dimethyl terephthalate, and dimethyl naphthalenedicarboxylate. The polyhydric alcohol may be bivalent diol, examples of which include ethylene glycol, propanediol, butanediol, neopentyl glycol, and cyclohexanedimethanol.

A representative example of the polyester-based resin includes polyethylene terephthalate that is a polycondensate of terephthalic acid and ethylene glycol. Although polyethylene terephthalate is a crystalline resin, it may be used before crystallization so that it can easily undergo stretching and other processes. If necessary, polyethylene terephthalate may undergo crystallization during stretching or other processes such as a heat treatment after stretching. A copolymerized polyester is also suitably used. Such a copolymerized polyester is obtained by copolymerizing an additional different monomer into the skeleton of polyethylene terephthalate so that crystallinity is lowered (or the polymer is made amorphous). Examples of such a resin include resins obtained by copolymerization with cyclohexanedimethanol or isophthalic acid. These resins are also suitably used because of their high stretchability.

Specific examples of the polyester-based resin other than polyethylene terephthalate and copolymers thereof include polybutylene terephthalate, polyethylene naphthalate, polybutylene naphthalate, polytrimethylene terephthalate, polytrimethylene naphthalate, polycyclohexane dimethyl terephthalate, polycyclohexane dimethyl naphthalate, and mixtures and copolymers thereof.

The (meth)acrylic resin is a resin composed of a (meth)acryloyl group-containing compound as a main monomer component. Specific examples of the (meth)acrylic resin include poly(meth)acrylates such as polymethyl methacrylate, methyl methacrylate-(meth)acrylic acid copolymers, methyl methacrylate-(meth)acrylate copolymers, methyl methacrylate-acrylate-(meth)acrylic acid copolymers, methyl (meth)acrylate-styrene copolymers (such as MS resins), and copolymers of methyl methacrylate and an alicyclic hydrocarbon group-containing compound (such as methyl methacrylate-cyclohexyl methacrylate copolymers and methyl methacrylate-norbornyl (meth)acrylate copolymers). A polymer composed mainly of poly($C_{1-6}$ alkyl (meth)acrylate) such as polymethyl (meth)acrylate is preferably used, and a methyl methacrylate-based resin mainly composed of methyl methacrylate (50 to 100% by weight and preferably 70 to 100% by weight) is more preferably used.

The polycarbonate-based resin is an engineering plastic composed of a polymer in which monomer units are linked by carbonate groups, and is a resin having a high level of impact resistance, heat resistance, flame retardancy, and transparency. The polycarbonate-based resin used to form substrate film 30 may also be a resin called modified polycarbonate, which has a modified polymer skeleton for reduction in photoelastic coefficient, or a copolymerized polycarbonate with improved wavelength dependency.

There are various commercially available products of the polycarbonate-based resin. Examples of commercially available products of the polycarbonate-based resin include Panlite (manufactured by Teijin Limited), Iupilon (manufactured by Mitsubishi Engineering-Plastics Corporation), SD POLYCA (manufactured by Sumitomo Dow Limited), and CALIBRE (manufactured by The Dow Chemical Company), all of which are trademarks.

Among the above, the polypropylene-based resin is preferably used in view of stretchability and heat resistance.

Description of the protective film is cited here in connection with the cyclic polyolefin-based resin and the cellulose ester-based resin that can be used for substrate film 30. The acyclic polyolefin-based resin, the polyester-based resin, the (meth)acrylic resin, or the polycarbonate-based resin described above in connection with substrate film 30 can also be used to form the protective film.

Substrate film 30 may also contain any appropriate additive in addition to the thermoplastic resin. Examples of such an additive include an ultraviolet absorber, an antioxidant, a lubricant, a plasticizer, a release agent, a discoloration preventing agent, a flame retardant, a nucleating agent, antistatic agent, a pigment, and a colorant. The content of the thermoplastic resin in substrate film 30 is preferably 50 to 100% by weight, more preferably 50 to 99% by weight, even more preferably 60 to 98% by weight, and particularly preferably 70 to 97% by weight. If the content of the thermoplastic resin in substrate film 30 is less than 50% by weight, high transparency and other properties inherent in the thermoplastic resin may insufficiently be exhibited.

A thickness of substrate film 30 may be determined as appropriate. Generally, in view of strength and workability such as handleability, the thickness of substrate film 30 is preferably 1 to 500 μm, more preferably 1 to 300 μm, even more preferably 5 to 200 μm, and most preferably 5 to 150 μm.

[Polyvinyl Alcohol-Based Resin-Containing Coating Liquid]

A coating liquid is preferably a polyvinyl alcohol-based resin solution obtained by dissolving polyvinyl alcohol-based resin powders in a good solvent (e.g., water). The polyvinyl alcohol-based resin has been described above in detail.

If necessary, the coating liquid may contain an additive such as a plasticizer or a surfactant. The plasticizer may be a polyol or a condensate thereof, examples of which include glycerol, diglycerol, triglycerol, ethylene glycol, propylene glycol, and polyethylene glycol. The additive is suitably added in an amount less than or equal to 20% by weight of the polyvinyl alcohol-based resin.

[Application of Coating Liquid and Drying of Coating Layer]

The method for applying the coating liquid to substrate film 30 can appropriately be selected from among wire bar coating, roll coating such as reverse coating or gravure coating, die coating, comma coating, lip coating, spin coating, screen coating, fountain coating, dipping, spraying, and other methods.

The coating liquid may be applied to both surfaces of substrate film 30. In this case, the coating liquid may be applied to one surface and then the other surface by using any of the above methods, or may be applied simultaneously to both surfaces of substrate film 30 by using dipping, spray coating, or other special devices.

A temperature and a time period for drying the coating layer (the polyvinyl alcohol-based resin layer before drying) are set depending on a type of the solvent in the coating liquid. A drying temperature is, set, for example, to 50 to 200° C. and preferably to 60 to 150° C. When the solvent contains water, the drying temperature is preferably higher than or equal to 80° C. A time period for drying is set, for example, to 2 to 20 minutes.

Polyvinyl alcohol-based resin layer 6 may be formed on only one or both of the two surfaces of substrate film 30. When polyvinyl alcohol-based resin layers 6 are formed on both surfaces, curling of the film that would occur during the production of a polarizing laminated film 300 (see FIG. 7) can be suppressed, and two polarizing plates can be obtained from a single polarizing laminated film 300. This is also advantageous for polarizing plate production efficiency.

In laminated film 100, polyvinyl alcohol-based resin layer 6 preferably has a thickness from 3 to 30 μm and more preferably from 5 to 20 μm. When polyvinyl alcohol-based resin layer 6 has a thickness in this range, polarizer 5 that is well dyed with the dichroic dye, has high polarizing performance, and has a thickness less than or equal to 10 μm can be obtained through stretching step S20 and dyeing step S30 described below. If polyvinyl alcohol-based resin layer 6 has a thickness greater than 30 μm, polarizer 5 may have a thickness greater than 10 μm. If polyvinyl alcohol-based resin layer 6 has a thickness less than 3 μm, the stretched product can be too thin and tend to have poor dyeability.

Before the coating liquid is applied, the surface of substrate film 30 on which at least polyvinyl alcohol-based resin layer 6 is to be formed may be subjected to a corona treatment, a plasma treatment, a flame treatment, or other treatments for improving adhesiveness between substrate film 30 and polyvinyl alcohol-based resin layer 6.

Before the coating liquid is applied, polyvinyl alcohol-based resin layer 6 may be formed on substrate film 30 with a primer or adhesive layer being interposed in order to improve adhesion between substrate film 30 and polyvinyl alcohol-based resin layer 6.

[Primer Layer]

The primer layer can be formed by applying a primer layer-forming coating liquid to the surface of substrate film 30 and then drying the coating. The primer layer-forming coating liquid contains a component capable of providing relatively strong adhesion to both of substrate film 30 and polyvinyl alcohol-based resin layer 6. The primer layer-forming coating liquid normally contains a resin component capable of providing such adhesion and a solvent. The resin component is preferably a thermoplastic resin with a high level of transparency, thermal stability, and stretchability, such as a (meth)acrylic resin or a polyvinyl alcohol-based resin. In particular, a polyvinyl alcohol-based resin that provides good adhesion is preferably used.

Examples of the polyvinyl alcohol-based resin include a polyvinyl alcohol resin and derivatives thereof. Examples of derivatives of a polyvinyl alcohol resin include polyvinyl formal, polyvinyl acetal, and other derivatives obtained by modifying a polyvinyl alcohol resin with olefins such as ethylene and propylene; derivatives obtained by modifying a polyvinyl alcohol resin with unsaturated carboxylic acids such as acrylic acid, methacrylic acid, and crotonic acid; derivatives obtained by modifying a polyvinyl alcohol resin with an alkyl ester of an unsaturated carboxylic acid; and derivatives obtained by modifying a polyvinyl alcohol resin with acrylamide. Among the examples of the polyvinyl alcohol-based resin, a polyvinyl alcohol resin is preferably used.

A solvent to be used is normally a common organic or aqueous solvent capable of dissolving a resin component. Examples of the solvent include aromatic hydrocarbons such as benzene, toluene, and xylene; ketones such as acetone, methyl ethyl ketone, and methyl isobutyl ketone; esters such as ethyl acetate and isobutyl acetate; chlorinated hydrocarbons such as methylene chloride, trichloroethylene, and chloroform; and alcohols such as ethanol, 1-propanol, 2-propanol, and 1-butanol. It should be noted that an organic solvent in the primer layer-forming coating liquid may dissolve substrate film 30 in the process of forming the primer layer with the coating liquid. Therefore, the solvent should preferably be selected also in consideration of solubility of substrate film 30. In view also of environmental impact, the primer layer is preferably formed by using a coating liquid containing water as a solvent.

In order to increase strength of the primer layer, a cross-linking agent may be added to the primer layer-forming coating liquid. The cross-linking agent may be any appropriate one selected from among organic, inorganic, and other known cross-linking agents, depending on a type of the thermoplastic resin used. The cross-linking agent may be, for example, an epoxy-based cross-linking agent, an isocyanate-based cross-linking agent, a dialdehyde-based cross-linking agent, or a metal-based cross-linking agent.

The epoxy-based cross-linking agent may be any of a one-component curing type and a two-component curing type. Examples thereof include ethylene glycol diglycidyl ether, polyethylene glycol diglycidyl ether, glycerin di- or tri-glycidyl ether, 1,6-hexanediol diglycidyl ether, trimethylolpropane triglycidyl ether, diglycidyl aniline, and diglycidyl amine.

Examples of the isocyanate-based cross-linking agent include tolylene diisocyanate, hydrogenated tolylene diisocyanate, trimethylolpropane-tolylene diisocyanate adducts, triphenylmethane triisocyanate, methylenebis(4-phenylmethane) triisocyanate, isophorone diisocyanate, and ketoxime- or phenol-blocked products thereof.

Examples of the dialdehyde-based cross-linking agent include glyoxal, malondialdehyde, succindialdehyde, glutardialdehyde, maleindialdehyde, and phthaldialdehyde.

Examples of the metal-based cross-linking agent include metal salts, metal oxides, metal hydroxides, and organometallic compounds. Examples of metal salts, metal oxides, and metal hydroxides include salts, oxides, and hydroxides of di- or polyvalent metals such as magnesium, calcium, aluminum, iron, nickel, zirconium, titanium, silicon, boron, zinc, copper, vanadium, chromium, and tin.

The organometallic compound is a compound having at least one intramolecular structure in which an organic group is bonded directly to a metal atom or bonded to a metal atom with an oxygen atom, a nitrogen atom, or other atoms being interposed therebetween. The organic group means a monovalent or polyvalent group containing at least a carbon atom, such as an alkyl group, an alkoxy group, or an acyl group. The term "bond" means not only covalent bond but also coordinate bond as in chelate compounds.

Suitable examples of the organometallic compound include organotitanium compounds, organozirconium compounds, organoaluminum compounds, and organosilicon compounds. One organometallic compound may be used alone, or two or more organometallic compounds may be used in combination.

Examples of organotitanium compounds include titanium orthoesters such as tetra-n-butyl titanate, tetraisopropyl titanate, butyl titanate dimer, tetra(2-ethylhexyl) titanate, and tetramethyl titanate; titanium chelates such as titanium acetylacetonate, titanium tetraacetylacetonate, polytitanium acetylacetonate, titanium octyleneglycolate, titanium lactate, titanium triethanolaminate, and titanium ethylacetoacetate; and titanium acylates such as polyhydroxytitanium stearate.

Examples of organozirconium compounds include zirconium n-propionate, zirconium n-butyrate, zirconium tetraacetylacetonate, zirconium monoacetylacetonate, zirconium bisacetylacetonate, and zirconium acetylacetonate bisethylacetoacetate.

Examples of organoaluminum compounds include aluminum acetylacetonate and aluminum organic acid chelates. Examples of organosilicon compounds include compounds in which ligands listed above for the organotitanium compounds and the organozirconium compounds are bonded to silicon.

In addition to low-molecular-weight cross-linking agents shown above, a polymer cross-linking agent such as a methylolated melamine resin or a polyamide epoxy resin can also be used. Examples of commercially available products of the polyamide epoxy resin include Sumirez Resin 650 (30) and Sumirez Resin 675 (both of which are trademarks) available from Taoka Chemical Co., Ltd.

When a polyvinyl alcohol-based resin is used as a resin component to form the primer layer, a polyamide epoxy resin, a methylolated melamine resin, a dialdehyde-based cross-linking agent, or a metal chelate compound-based cross-linking agent is suitably used as the cross-linking agent.

A ratio between a resin component and a cross-linking agent in the primer layer-forming coating liquid may be as follows. Based on 100 parts by weight of the resin component, an amount of the cross-linking agent may appropriately be determined in a range approximately from 0.1 to 100 parts by weight depending on a type of the resin component or the cross-linking agent, and preferably selected within a range approximately from 0.1 to 50 parts by weight. The primer layer-forming coating liquid is preferably prepared so as to have a solid concentration of about 1 to about 25% by weight.

The primer layer preferably has a thickness approximately from 0.05 to 1 µm and more preferably from 0.1 to 0.4 µm. The primer layer with a thickness less than 0.05 µm will be less effective in improving adhesion between substrate film 30 and polyvinyl alcohol-based resin layer 6. The primer layer with a thickness greater than 1 µm is disadvantageous for reduction in thickness of the polarizing plate.

The primer layer-forming coating liquid may be applied to substrate film 30 by a method the same as that for the polyvinyl alcohol-based resin layer-forming coating liquid.

The primer layer is applied to the surface to which the polyvinyl alcohol-based resin layer-forming coating liquid is to be applied (one or both surfaces of substrate film 30). A temperature and a time period for drying the coating layer of the primer layer-forming coating liquid are set depending on a type of the solvent in the coating liquid. A temperature for drying is set, for example, to 50 to 200° C. and preferably to 60 to 150° C. When the solvent contains water, the temperature for drying is preferably higher than or equal to 80° C. A time period for drying is set, for example, to 30 seconds to 20 minutes.

When the primer layer is provided, the steps of forming coatings on substrate film 30 may be performed in any order. For example, the process of forming polyvinyl alcohol-based resin layers 6 on both surfaces of substrate film 30 may include forming the primer layers on both surfaces of substrate film 30 and then forming polyvinyl alcohol-based resin layers 6 on both surfaces. Alternatively, the primer layer and polyvinyl alcohol-based resin layer 6 may sequentially be formed on one surface of substrate film 30, and then the primer layer and polyvinyl alcohol-based resin layer 6 may sequentially be formed on the other surface of substrate film 30.

(2) Stretching Step S20

Figure 6:
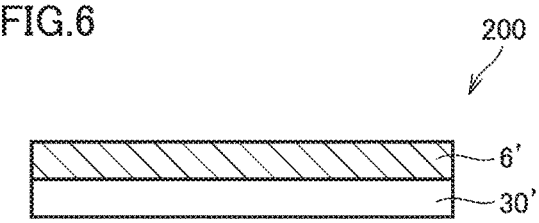
FIG. 6 is a schematic cross-sectional view showing an example of a layered structure of a stretched film obtained in a stretching step.

Referring to FIG. 6, the present step includes stretching laminated film 100 including substrate film 30 and polyvinyl alcohol-based resin layer 6 to obtain a stretched film 200 including a stretched substrate film 30' and a stretched polyvinyl alcohol-based resin layer 6'. Stretching treatment is generally uniaxial stretching.

A stretch ratio to which laminated film 100 is stretched can be selected, as appropriate, depending on desired polarizing properties. The stretch ratio is preferably from more than 5 to less than or equal to 17 and more preferably from more than 5 to less than or equal to 8 relative to the original length of laminated film 100. If the stretch ratio is less than or equal to 5, polyvinyl alcohol-based resin layer 6 may fail to sufficiently be oriented so that polarizer 5 may fail to have a sufficiently high degree of polarization. On the other hand, if the stretch ratio exceeds 17, the film can easily be broken during stretching, and stretched film 200 may be thinner than necessary so that it may have lower workability and handleability in later steps.

A stretching treatment is not limited to single-stage stretching and can also be multi-stage stretching. In this case, the entire stretching treatment in multiple stages may continuously be performed before dyeing step S30, or the stretching treatment in second and later stretching stages may be performed simultaneously with a dyeing treatment and/or a cross-linking treatment in dyeing step S30. When the stretching treatment in multiple stages is performed as such, the stretching treatment is preferably performed in such a way that the cumulative stretch ratio of all stretching stages exceeds 5.

The stretching treatment may be longitudinal stretching that is performed in the longitudinal direction of the film (the film feed direction), transverse stretching that is performed in the widthwise direction of the film, or oblique stretching. Longitudinal stretching may be stretching between rolls that is performed by using rolls, compressing stretching, stretching with chucks (clips), or the like. Transverse stretching may be tentering or the like. The stretching treatment may be performed by using any of wet stretching and dry stretching. Use of dry stretching is preferred in that a temperature for stretching can be selected within a wide range.

A stretching temperature is set to be higher than or equal to a temperature at which polyvinyl alcohol-based resin layer 6 and substrate film 30 exhibit such fluidity that they can be stretched as a whole. The stretching temperature is preferably in the range from −30° C. to +30° C. representing a phase transition temperature (melting point or glass transition temperature) of substrate film 30, more preferably in the range from −30° C. to +5° C., and even more preferably in the range from −25° C. to +0° C. When substrate film 30 is composed of two or more resin layers, the phase transition temperature means the highest phase transition temperature of the phase transition temperatures of the two or more resin layers.

If the stretching temperature is lower than a phase transition temperature of −30° C., it may be difficult to achieve a high stretch ratio greater than 5, or substrate film 30 may have too low fluidity and tend to be difficult to be stretched. If the stretching temperature exceeds a phase transition temperature of +30° C., substrate film 30 may have too high fluidity and tend to be difficult to be stretched. The stretching temperature is more preferably higher than or equal to 120° C. in the above range, so that a high stretch ratio greater than 5 can more easily be achieved. This is because when the stretching temperature is higher than or equal to 120° C., the stretching treatment can be performed with no difficulty even at a high stretch ratio greater than 5.

The method of heating laminated film 100 in the stretching treatment may be a zone heating method (e.g., a method of heating in a stretching zone such as a heating furnace in which adjustment to a certain temperature has been made by blowing of hot air); a method of heating rolls themselves used for stretching; or a heater heating method (a method of heating with radiant heat from infrared heaters, halogen heaters, panel haters, or other heaters placed above and below laminated film 100). In the method of stretching between rolls, the zone heating method is preferred in view of stretching temperature uniformity. In this case, two nip roll pairs may be placed in or outside a temperature controlled stretching zone. Preferably, the two nip roll pairs are placed outside the stretching zone in order to prevent sticking between laminated film 100 and nip rolls.

In the case of the zone heating method, the stretching temperature means a temperature of an atmosphere in the zone (e.g., in a heating furnace). When heating is performed in a furnace in the heater heating method, the stretching temperature also means a temperature of an atmosphere in the furnace. In the method of heating rolls themselves, the stretching temperature means a temperature of a roll surface.

A preheating step of preheating laminated film 100 may be performed before stretching step S20. The preheating method may be the same as the heating method in the stretching treatment. When the stretching treatment is performed by stretching between rolls, preheating may be performed at any time before, while, or after the film passes between nip rolls on the upstream side. When the stretching treatment is performed with hot roll stretching, preheating is preferably performed before the film passes between hot rolls. When the stretching treatment is performed with stretching with chucks, preheating is preferably performed before a distance between the chucks is increased. A preheating temperature is preferably in a range from −50° C. to ±0° C. representing a stretching temperature and more preferably in a range from −40° C. to −10° C. representing a stretching temperature.

After the stretching treatment in stretching step S20, a heat setting step may be performed. Heat setting is a process of subjecting stretched film 200 to heat treatment at a temperature higher than or equal to a crystallization temperature while ends of stretched film 200 are held under tension with clips. Heat setting facilitates crystallization of polyvinyl alcohol-based resin layer 6'. A heat setting temperature is preferably in a range from −80° C. to −0° C. representing a stretching temperature and more preferably a range from −50° C. to −0° C. representing a stretching temperature.

(3) Dyeing Step S30

Figure 7:
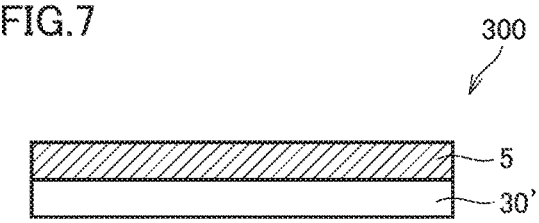
FIG. 7 is a schematic cross-sectional view showing an example of a layered structure of a polarizing laminated film obtained in a dyeing step.

Referring to FIG. 7, the present step includes dyeing polyvinyl alcohol-based resin layer 6' of stretched film 200 with a dichroic dye and adsorbing and orienting the dichroic dye to form polarizer 5. After the present step, polarizing laminated film 300 having substrate film 30' and polarizer 5 disposed on one or both surfaces thereof is obtained.

The dyeing step can be performed by immersing the entire stretched film 200 in a dichroic dye-containing solution (dyeing solution). The dyeing solution can be a solution obtained by dissolving the dichroic dye in a solvent. Water is generally used as the solvent for the dyeing solution. An organic solvent miscible with water may further be added to water. The dyeing solution preferably has a dichroic dye concentration from 0.01 to 10% by weight, more preferably from 0.02 to 7% by weight, and even more preferably from 0.025 to 5% by weight.

When iodine is used as the dichroic dye, an iodide is preferably further added to the iodine-containing dyeing solution so that dyeing efficiency can further be improved. Examples of the iodide include potassium iodide, lithium iodide, sodium iodide, zinc iodide, aluminum iodide, lead iodide, copper iodide, barium iodide, calcium iodide, tin iodide, and titanium iodide. The dyeing solution preferably has an iodide concentration from 0.01 to 20% by weight. Among the iodides, potassium iodide is preferably added. When potassium iodide is added, a weight ratio of iodine to potassium iodide is preferably in a range from 1:5 to 1:100, more preferably in a range from 1:6 to 1:80, and even more preferably in a range from 1:7 to 1:70.

Stretched film 200 is normally immersed in the dyeing solution for a time period in a range from 15 seconds to 15 minutes and preferably from 30 seconds to 3 minutes. A temperature of the dyeing solution is preferably in a range from 10 to 60° C. and more preferably in a range from 20 to 40° C.

Dyeing step S30 can also be performed before stretching step S20, or these steps can also be performed at the same time. Dyeing step S30 is preferably performed after at least a certain level of stretching is achieved for laminated film 100 so that the dichroic dye adsorbed to the polyvinyl alcohol-based resin layer can well be oriented. Specifically, dyeing step S30 can be performed on stretched film 200 obtained by performing stretching until a target ratio is attained in stretching step S20, or the stretching treatment can also be performed to a ratio lower than the target in stretching step S20 and then the stretching treatment can also be performed in dyeing step S30 until the total stretch ratio reaches the target ratio. The latter embodiment may be a process 1) that includes performing the stretching treatment to a ratio lower than the target in stretching step S20 and then performing the stretching treatment during the dyeing treatment in dyeing step S30 in such a way that the total stretch ratio reaches the target ratio. When a cross-linking treatment is performed after the dyeing treatment as described below, such an embodiment may also be a process 2) that includes performing the stretching treatment to a ratio lower than the target in stretching step S20, then performing the stretching treatment to such an extent that the total stretch ratio is still lower than the target ratio during the dyeing treatment in dyeing step S30, and then performing the stretching treatment during the cross-linking treatment in such a way that the total stretch ratio finally reaches the target ratio.

Dyeing step S30 can include a cross-linking treatment step that follows the dyeing treatment. The cross-linking treatment can be performed by immersing the dyed film in a cross-linking agent-containing solution (cross-linking solution). A conventionally known material can be used as the cross-linking agent, examples of which include a boron compound such as boric acid and borax, glyoxal, and glutaraldehyde. One cross-linking agent may be used alone, or two or more cross-linking agents may be used in combination.

The cross-linking solution can specifically be a solution obtained by dissolving a cross-linking agent in a solvent. For example, water can be used as the solvent. In addition to water, the solvent may further contain an organic solvent miscible with water. A concentration of the cross-linking agent in the cross-linking solution is preferably in a range from 1 to 20% by weight and more preferably in a range from 6 to 15% by weight.

The cross-linking solution can contain an iodide. Addition of an iodide allows polarizer 5 to have more uniform in-plane polarization performance. Examples of the iodide include potassium iodide, lithium iodide, sodium iodide, zinc iodide, aluminum iodide, lead iodide, copper iodide, barium iodide, calcium iodide, tin iodide, and titanium iodide. The cross-linking solution preferably has an iodide concentration from 0.05 to 15% by weight and more preferably from 0.5 to 8% by weight.

The dyed film is normally immersed in the cross-linking solution for a time period from 15 seconds to 20 minutes and preferably from 30 seconds to 15 minutes. A temperature of the cross-linking solution is preferably in a range from 10 to 90° C.

The cross-linking agent can be added to the dyeing solution so that the cross-linking treatment can be performed simultaneously with the dyeing treatment. The stretching treatment may also be performed during the cross-linking treatment. A specific embodiment in which the stretching treatment is performed during the cross-linking treatment is as described above. The treatment of immersion in the cross-linking solution may also be performed twice or more by using two or more cross-linking solutions different in composition.

After dyeing step S30, a washing step and a drying step are preferably performed before first bonding step S40 described below. The washing step normally includes a water washing step. The water washing treatment can be performed by immersing the dyed or cross-linked film in pure water such as ion-exchanged water or distilled water. A water washing temperature is normally in a range from 3 to 50° C. and preferably in a range from 4 to 20° C. A time period of immersion in water is normally set to 2 to 300 seconds and preferably to 3 to 240 seconds.

The washing step may be a combination of the water washing step and the step of washing with an iodide solution. A washing liquid for use in the water washing step and/or the washing treatment with an iodide solution can contain water and optionally a liquid alcohol such as methanol, ethanol, isopropyl alcohol, butanol, or propanol.

The drying step performed after the washing step may be performed with any appropriate method such as air drying, air blow drying, or drying by heating. For example, in the case of drying by heating, a drying temperature is normally from 20 to 95° C., and a time period for drying is normally approximately from 1 to 15 minutes.

(4) First Bonding Step S40

Figure 8:
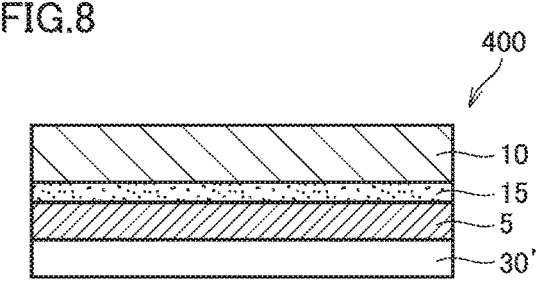
FIG. 8 is a schematic cross-sectional view showing an example of a layered structure of a laminate film obtained in a first bonding step.

Referring to FIG. 8, the present step includes bonding any one of first protective film 10 and second protective film 20 onto polarizer 5 of polarizing laminated film 300, that is, to the surface of polarizer 5 opposite to substrate film 30' side, with an adhesive layer being interposed, to obtain a laminate film 400. FIG. 8 shows an example in which first protective film 10 is bonded with first adhesive layer 15 being interposed, however, second protective film 20 may be bonded with second adhesive layer 25 being interposed. When polarizing laminated film 300 has polarizers 5 on both surfaces of substrate film 30', protective films are normally bonded to respective polarizers 5 on both surfaces. In this case, protective films may be of the same or different types.

A protective film (first protective film 10 or second protective film 20) is bonded to polarizer 5 with an adhesive layer (first adhesive layer 15 or second adhesive layer 25) being interposed.

Bonding of a protective film with an adhesive layer being interposed is achieved, for example, by a bonding method with the use of a bonding roll by applying an adhesive to a bonding surface of a protective film and/or polarizer 5 with known means and layering the protective film and polarizer 5 with the layer of the applied adhesive being interposed.

In order to achieve decrease in thickness of the adhesive layer as with the case of first adhesive layer 15, a method of applying an adhesive with the use of a micro-gravure is suitable. Among others, a thickness of an adhesive layer can be decreased with a method of relatively increasing a speed of rotation of a gravure by setting a gravure rotation draw (a ratio of a speed of rotation of a gravure to a line speed) or a method of increasing the number of lines of a mesh of a gravure. In particular, in order to set a thickness of an adhesive layer to 1 μm or smaller, a gravure having a mesh engraved with laser engraving is preferably employed and a gravure roll including honeycomb shapes is particularly preferably employed. For example, a roll including honeycomb shapes of which number of honeycombs per inch exceeds 400 columns is suitably employed.

When a photo-curable adhesive is used as the adhesive, bonding described above is followed by a curing step in which the photo-curable adhesive is cured by exposure to active energy rays. A light source for the active energy rays is preferably, but not particularly limited to, active energy rays (ultraviolet rays) having an emission distribution at a wavelength less than or equal to 400 nm. Specifically, a low-pressure mercury lamp, a medium-pressure mercury lamp, a high-pressure mercury lamp, an ultrahigh-pressure mercury lamp, a chemical lamp, a black light lamp, a microwave-excited mercury lamp, or a metal halide lamp is preferably used.

Intensity of irradiation of the photo-curable adhesive with light is determined as appropriate depending on a composition of the photo-curable adhesive, and it is preferably set such that intensity of irradiation in a wavelength region effective for activation of the polymerization initiator is 0.1 to 6000 mW/cm$^2$. When irradiation intensity is higher than or equal to 0.1 mW/cm$^2$, a reaction time will be not too long, and when it is lower than or equal to 6000 mW/cm$^2$, heat radiated from the light source and generation of heat during curing of the photo-curable adhesive will be less likely to cause yellowing of the photo-curable adhesive or degradation of polarizer 5.

A time period of irradiation of the photo-curable adhesive with light is also determined as appropriate depending on a composition of the photo-curable adhesive. Preferably, the irradiation time period is set such that an integrated light amount expressed as the product of the irradiation intensity and the irradiation time period is 10 to 10000 mJ/cm$^2$. When the integrated light amount is greater than or equal to 10 mJ/cm$^2$, a sufficient amount of active species derived from the polymerization initiator can be produced so that curing reaction can be allowed to more reliably proceed. When it is less than or equal to 10000 mJ/cm$^2$, the irradiation time period will not be too long so that good productivity can be maintained.

When a water-based adhesive is used, normally, the step of drying bonded films is performed to remove water contained in the water-based adhesive after bonding. Drying can be performed, for example, by introducing the laminated film into a drying furnace. A drying temperature (a temperature of the drying furnace) is preferably set to 30 to 90° C. If it is lower than 30° C., the protective film tends to easily separate from polarizer 5. If the drying temperature exceeds 90° C., polarizing performance of polarizer 5 may be degraded by heat. The drying time period can be approximately from 10 to 1000 seconds.

The drying step may be followed by the step of aging at room temperature or a temperature slightly higher than room temperature such as a temperature approximately from 20 to 45° C. for about 12 to 600 hours. An aging temperature is generally set to be lower than the drying temperature.

Before a protective film is bonded to polarizer 5, a surface of the protective film on the side of polarizer 5 can be subjected to a surface treatment (adhesion promoting treatment) such as a plasma treatment, a corona treatment, an ultraviolet irradiation treatment, a flame treatment, or a saponification treatment in order to have improved adhesion to polarizer 5. In particular, a plasma treatment, a corona treatment, or a saponification treatment is preferably performed. For example, when the protective film is composed of a cyclic polyolefin-based resin, a plasma treatment or a corona treatment is normally performed. When the protective film is composed of a cellulose ester-based resin, a saponification treatment is normally performed. The saponification treatment may be a method of immersing the film in an aqueous solution of an alkali such as sodium hydroxide or potassium hydroxide.

(5) Peeling Step S50

Figure 9:
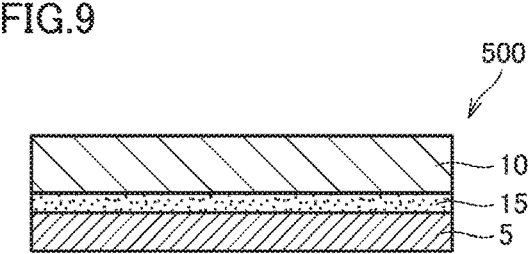
FIG. 9 is a schematic cross-sectional view showing one example of a layered structure of a single side protective film-bearing polarizing plate obtained in a peeling step.

Referring to FIG. 9, the present step includes peeling off substrate film 30' from laminate film 400 obtained after the protective film is bonded. After this step, a single side protective film-bearing polarizing plate 500 in which a protective film (first protective film 10 in the example in FIG. 9) is disposed on one surface of polarizer 5 can be obtained. When polarizing laminated film 300 has polarizers 5 on both surfaces of substrate film 30' and protective films are bonded to respective polarizers 5, two single side protective film-bearing polarizing plates 500 are obtained from single polarizing laminated film 300 after peeling step S50.

The method of peeling off substrate film 30' is not particularly limited. Substrate film 30' can be peeled off by a method the same as in the step of peeling off a separator (release film) that is performed on a normal pressure-sensitive adhesive-bearing polarizing plate. Substrate film 30' may be peeled off immediately after first bonding step S40. Alternatively, after first bonding step S40, the film may be wound in a form of a roll, and then substrate film 30' may be peeled off while the roll is unwound in a later step.

(6) Second Bonding Step S60

The present step includes bonding another one of first and second protective films 10 and 20 to polarizer 5 of single side protective film-bearing polarizing plate 500, that is, to the surface opposite to the protective film bonded in first bonding step S40, with an adhesive layer being interposed, to obtain double side protective film-bearing polarizing plate 1 according to the present invention as shown in FIG. 1. Description of first bonding step S40 is cited here in connection with the method of bonding a protective film and the surface treatment (adhesion promoting treatment) for bonding the protective film.

<Display Apparatus>

Referring to FIG. 2, a display apparatus according to the present invention includes cell for display 50 and polarizing plate 1 according to the present invention described above, which is arranged on at least one surface of the cell. Polarizing plate 1 can be arranged and bonded on cell for display 50 with the use of pressure-sensitive adhesive layer 60 provided on the outer surface of second protective film 20 arranged on the side of cell for display 50. In such a display apparatus, first protective film 10 of polarizing plate 1 forms the outer surface of the display apparatus (typically, the outermost surface). According to the present invention, since irregularities at the surface of first protective film 10 can effectively be suppressed, the display apparatus has good appearance. Light leakage in a black display state can also effectively be suppressed.

The display apparatus is represented by a liquid crystal display in which cell for display 50 is implemented by a liquid crystal cell, however, it may be another display apparatus such as an organic EL apparatus. In the display apparatus, the polarizing plate should only be arranged on at least one surface of cell for display 50, however, it can also be arranged on both surfaces.

When a liquid crystal display is employed as the display apparatus, a polarizing plate is normally arranged on both surfaces of a liquid crystal cell. In this case, the polarizing plate according to the present invention may be employed for the polarizing plate on both surfaces or for the polarizing plate on only one surface. In the latter case, the polarizing plate according to the present invention may be provided on a front side (a viewing side) or on a rear side (a backlight side), with the liquid crystal cell being defined as the reference. A liquid crystal cell of a conventionally known type can be employed as the liquid crystal cell.

EXAMPLES

Hereinafter, the present invention will more specifically be described with reference to examples and comparative examples, however, the present invention is not limited to these examples and comparative examples.

Example 1

(1) Primer Layer Forming Step

Polyvinyl alcohol powders (Z-200 manufactured by The Nippon Synthetic Chemical Industry Co., Ltd., 1100 in average polymerization degree, 99.5 mol % in saponification degree) were dissolved in hot water at 95° C. to form a 3% by weight polyvinyl alcohol aqueous solution. A primer layer-forming coating liquid was obtained by mixing the resulting aqueous solution and a cross-linking agent (Sumirez Resin 650 manufactured by Taoka Chemical Co., Ltd.) at a ratio of 5 parts by weight of the cross-linking agent to 6 parts by weight of the polyvinyl alcohol powders.

Subsequently, a 90-μm-thick unstretched polypropylene (PP) film (melting point: 163° C.) was prepared as a substrate film, and one surface of the film was subjected to a corona treatment. The primer layer-forming coating liquid was applied to the corona-treated surface by using a micro-gravure coater, and then dried at 80° C. for 10 minutes to form a 0.2-μm-thick primer layer.

(2) Preparation of Laminated Film (Resin Layer Forming Step)

Polyvinyl alcohol powders (PVA 124 manufactured by KURARAY Co., Ltd., 2400 in average polymerization degree, 98.0-99.0 mol % in saponification degree) were dissolved in hot water at 95° C. to form an 8% by weight polyvinyl alcohol aqueous solution, which was used as a polyvinyl alcohol-based resin layer-forming coating liquid.

Using a lip coater, the polyvinyl alcohol-based resin layer-forming coating liquid was applied to the surface of the primer layer on the substrate film having the primer layer prepared in step (1). The coating was then dried at 80° C. for 20 minutes to form a polyvinyl alcohol-based resin layer on the primer layer, so that a laminated film constituted of the substrate film, the primer layer, and the polyvinyl alcohol-based resin layer was obtained.

(3) Preparation of Stretched Film (Stretching Step)

Using a floating longitudinal uniaxial stretching machine, the laminated film prepared in step (2) was subjected to free-end uniaxial stretching to 5.8 times at 160° C. to form a stretched film. After stretching, the polyvinyl alcohol-based resin layer had a thickness of 6.1 μm.

(4) Preparation of Polarizing Laminated Film (Dyeing Step)

The polyvinyl alcohol-based resin layer was dyed by immersing the stretched film prepared in step (3) for about 180 seconds in a dyeing aqueous solution at 30° C. containing iodine and potassium iodide (containing 0.6 parts by weight of iodine and 10 parts by weight of potassium iodide with respect to 100 parts by weight of water). Subsequently, the excess dyeing aqueous solution was washed away with pure water at 10° C.

Subsequently, the dyed film was immersed for 120 seconds in a first cross-linking aqueous solution at 78° C. containing boric acid (containing 9.5 parts by weight of boric acid with respect to 100 parts by weight of water) and then immersed for 60 seconds in a second cross-linking aqueous solution at 70° C. containing boric acid and potassium iodide (containing 9.5 parts by weight of boric acid and 4 parts by weight of potassium iodide with respect to 100 parts by weight of water) so that a cross-linking treatment was performed. Subsequently, the film was washed with pure water at 10° C. for 10 seconds and finally dried at 40° C. for 300 seconds, so that a polarizing laminated film constituted of the substrate film, the primer layer, and the polarizer was obtained.

(5) Preparation of Polarizing Plate (First Bonding Step, Peeling Step, and Second Bonding Step)

A cyclic polyolefin-based resin film (ZF14 manufactured by Zeon Corporation and having a thickness of 23 μm) was prepared as a first protective film to be arranged on the outer side (the viewing side) in arrangement of a polarizing plate on a cell for display. After the bonding surface of this first protective film was subjected to the corona treatment, a photo-curable adhesive (KR-70T manufactured by ADEKA Corporation) was applied to the corona treated surface with the use of a micro-gravure coater. The first protective film was arranged on the polarizer of the polarizing laminated film prepared in (4) with the layer of the applied adhesive being interposed, and thereafter bonding with a bonding roll was carried out. Then, a first adhesive layer was formed by curing the adhesive through irradiation with ultraviolet rays, and a laminate film constituted of the layered structure of the first protective film, the first adhesive layer, the polarizer, the primer layer, and the substrate film was obtained (the first bonding step). The first adhesive layer had thickness $T_1$ of 0.2 μm.

Then, the substrate film was removed by peeling off from the obtained laminate film (the peeling step). The substrate film was readily peeled off and a single side protective film-bearing polarizing plate constituted of the layered structure of the first protective film, the first adhesive layer, the polarizer, and the primer layer was obtained.

A cyclic polyolefin-based resin film (ZF14 manufactured by Zeon Corporation and having a thickness of 23 μm) was prepared as a second protective film to be arranged on the side of the cell for display in arrangement of a polarizing plate on the cell for display. After the bonding surface of this second protective film was subjected to the corona treatment, a photo-curable adhesive (KR-70T manufactured by ADEKA Corporation) was applied to the corona treated surface with the use of a micro-gravure coater. The second protective film was arranged on the surface of the obtained single side protective film-bearing polarizing plate opposite to the first protective film with the layer of the applied adhesive being interposed, and thereafter bonding with a bonding roll was carried out. Then, a second adhesive layer was formed by curing the adhesive through irradiation with ultraviolet rays, and a polarizing plate constituted of the layered structure of the first protective film, the first adhesive layer, the polarizer, the primer layer, the second adhesive layer, and the second protective film was obtained. The second adhesive layer had thickness $T_2$ of 1.3 μm.

Thicknesses $T_1$ and $T_2$ of the first and second adhesive layers were measured as follows. A "thickness of the first or second protective film" before application of a photo-curable adhesive and a "total thickness of the first or second protective film and the layer of the applied adhesive" after application of the photo-curable adhesive (before bonding with the polarizer) were measured with a contactless light interference type film thickness measurement instrument (F-20 manufactured by Filmetrics Japan, Inc.) and a difference therebetween was defined as thickness $T_1$ or $T_2$ of the first or second adhesive layer. It has been confirmed that the thickness of the adhesive layer thus obtained before bonding to the polarizer and before curing was substantially maintained also after bonding to the polarizer and curing, and was substantially the same as the thickness of the adhesive layer after curing in the obtained polarizing plate, based on observation with a scanning electron microscope (SEM) of the thickness of the adhesive layer in a cross-section obtained by cutting of the obtained polarizing plate and actual measurement of the thickness.

Examples 2 to 5 and Comparative Examples 1 to 2

A polarizing plate was prepared as in Example 1 except for setting thicknesses $T_1$ and $T_2$ of the first and second adhesive layers to thicknesses as shown in Table 1.

[Evaluation of Distortion of Reflected Image and Light Leakage]

(1) Evaluation of Distortion of Reflected Image

A sample for evaluation was obtained by cutting the polarizing plate obtained in each of Examples and Comparative Examples to a 4" size and bonding the resultant polarizing plate to one surface of a liquid crystal cell with the pressure-sensitive adhesive layer being interposed on the side of the second protective film. A fluorescent lamp was reflected in regular reflection on the surface of the first protective film for the sample for evaluation, and distortion of the reflected image was visually evaluated under criteria below. Table 1 shows results.

A: The reflected image was extremely sharp without distortion.

B: The reflected image was sharp, substantially without distortion.

C: A relatively sharp reflected image was obtained, although it was slightly distorted.

D: Distortion was great.

(2) Evaluation of Light Leakage

A polarizing plate having a 4" size was bonded similarly also to the other surface of the liquid crystal cell in the sample for evaluation used in (1) above. Here, the polarizing plate on the other surface was bonded such that polarizing plates on the front and the rear form crossed nicols (such that absorption axes of the polarizers were orthogonal to each other). Light was emitted from the side of the surface of the first protective film of one polarizing plate in the obtained sample for evaluation and whether or not there is light which passes to the side of the first protective film of the other polarizing plate in a black display state (light leakage) was evaluated based on visual observation under criteria below. Table 1 shows results.

A: No light leakage

B: Light leakage is observed (bright points are present).

TABLE 1

| | Thickness of First Adhesive Layer $T_1$ (μm) | Thickness of Second Adhesive Layer $T_2$ (μm) | Evaluation of Distortion of Reflected Image | Evaluation of Light Leakage |
|---|---|---|---|---|
| Example 1 | 0.2 | 1.3 | A | A |
| Example 2 | 0.3 | 1.3 | A | A |
| Example 3 | 0.4 | 1.3 | A | A |
| Example 4 | 0.5 | 1.3 | B | A |
| Example 5 | 0.7 | 1.3 | C | A |
| Comparative Example 1 | 1.3 | 1.3 | D | A |
| Comparative Example 2 | 0.5 | 0.5 | A | B |

REFERENCE SIGNS LIST

1 polarizing plate; 5 polarizer; 10 first protective film; 15 first adhesive layer; 20 second protective film; 25 second adhesive layer; 6 polyvinyl alcohol-based resin layer; 6' stretched polyvinyl alcohol-based resin layer; 30 substrate film; 30' stretched substrate film; 50 cell for display; 60 pressure-sensitive adhesive layer; 100 laminated film; 200 stretched film; 300 polarizing laminated film; 400 laminate film; and 500 single side protective film-bearing polarizing plate.

The invention claimed is:

1. A polarizing plate comprising:
a polarizer having a first surface and an opposing second surface;
a first protective film disposed on the first surface of the polarizer with a first adhesive layer having a thickness less than 2.0 μm being interposed; and
a second protective film disposed on the second surface of the polarizer with a second adhesive layer having a thickness less than or equal to 2.0 μm being interposed,
the second protective film being a protective film to be arranged on a side of a cell for display relative to the first protective film in arrangement of the polarizing plate on the cell for display, the polarizer having a thickness less than or equal to 7 μm, the polarizing being stretched to a stretch ratio of more than 5, the first protective film having a thickness 5 to 50 μm, the second protective film having a thickness 5 to 50 μm, and the first adhesive layer being smaller in thickness than the second adhesive layer.

2. The polarizing plate according to claim 1, wherein the first and second adhesive layers are each a layer of a cured product of a photo-curable adhesive.

3. The polarizing plate according to claim 1, wherein the first adhesive layer has a thickness less than or equal to 0.7 μm.

4. The polarizing plate according to claim 1, wherein a difference in thickness between the second adhesive layer and the first adhesive layer is greater than or equal to 0.3 μm.

5. The polarizing plate according to claim 1, the polarizing plate further comprising a pressure-sensitive adhesive layer for bonding to the cell for display, wherein the second protective film comprises an outer surface and the pressure-sensitive adhesive layer is laminated on the outer surface of the second protective film.

6. A display apparatus comprising:
a cell for display; and
the polarizing plate according to claim 1 arranged on at least one surface of the cell for display.

* * * * *